(12) United States Patent
Yazaki et al.

(10) Patent No.: US 11,682,935 B2
(45) Date of Patent: *Jun. 20, 2023

(54) ROTARY ELECTRIC MACHINE WITH ROTOR HAVING PERMANENT MAGNETS WITH RATIOS OF TOTAL SURFACE AREA AND A STATOR WITH TOOTH HAVING WIDE ENDS

(71) Applicant: HONDA MOTOR CO., LTD., Tokyo (JP)

(72) Inventors: Manabu Yazaki, Wako (JP); Yoshihisa Kubota, Wako (JP); Shoei Abe, Wako (JP); Sho Yaegaki, Wako (JP); Shigeru Tajima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 20 days.

This patent is subject to a terminal disclaimer.

(21) Appl. No.: 17/482,498

(22) Filed: Sep. 23, 2021

(65) Prior Publication Data
US 2022/0103032 A1    Mar. 31, 2022

(30) Foreign Application Priority Data
Sep. 29, 2020    (JP) .............................. JP2020-163295

(51) Int. Cl.
*H02K 1/276* (2022.01)
*H02K 1/14* (2006.01)

(52) U.S. Cl.
CPC ............. *H02K 1/276* (2013.01); *H02K 1/146* (2013.01); *H02K 2213/03* (2013.01)

(58) Field of Classification Search
CPC ... H02K 1/2783; H02K 2213/03; H02K 3/487
USPC .... 310/156.08, 156.12, 156.13, 156, 156.43, 310/156.45, 156.38, 156.25, 12.21, 214, 310/216.069, 216.071, 216.072, 216.019, 310/216.106, 187, 216.129, 216.008, (Continued)

(56) References Cited

U.S. PATENT DOCUMENTS

| 2004/0135441 | A1* | 7/2004 | Groening | H02K 1/20 310/58 |
| 2005/0110361 | A1* | 5/2005 | Blouin | H02K 15/06 310/216.012 |

(Continued)

FOREIGN PATENT DOCUMENTS

| JP | 2006-262603 | 9/2006 |
| JP | 2007-028734 | 2/2007 |

(Continued)

*Primary Examiner* — Maged M Almawri
(74) *Attorney, Agent, or Firm* — Amin, Turocy & Watson, LLP

(57) ABSTRACT

A first magnet, a second magnet, a fourth magnet, and a third magnet are retained on a rotor of a rotary electric machine in this order alongside one another in a circumferential direction. Magnetic fields of the first magnet and the fourth magnet are oriented in radial directions of a stator. Magnetic fields of the second magnet and the third magnet are oriented in circumferential directions of the stator. When the rotor is viewed in plan from above or below, a ratio of a total surface area of the first magnet and the fourth magnet to a total surface area of the second magnet and the third magnet is $S14:S23 = 1:0.2$ to $1:1$.

8 Claims, 12 Drawing Sheets

(58) Field of Classification Search
USPC .... 310/216.009, 216.077, 216.097, 216.111, 310/216.119, 156.57, 156.53, 156.56
See application file for complete search history.

(56) References Cited

U.S. PATENT DOCUMENTS

| | | | | |
|---|---|---|---|---|
| 2006/0290225 | A1* | 12/2006 | Mipo | H02K 1/16 |
| | | | | 310/216.069 |
| 2008/0129136 | A1* | 6/2008 | Abe | H02K 21/042 |
| | | | | 310/156.35 |
| 2009/0251021 | A1* | 10/2009 | Atarashi | H02P 6/16 |
| | | | | 310/156.07 |
| 2010/0019626 | A1* | 1/2010 | Stout | H02K 1/278 |
| | | | | 310/214 |
| 2010/0026008 | A1* | 2/2010 | Sawahata | H02K 1/165 |
| | | | | 310/179 |
| 2010/0141075 | A1* | 6/2010 | Atarashi | H02K 21/24 |
| | | | | 310/156.35 |
| 2011/0198962 | A1* | 8/2011 | Tang | H02K 3/28 |
| | | | | 310/216.069 |
| 2011/0309707 | A1* | 12/2011 | Kato | H02K 1/30 |
| | | | | 310/156.54 |
| 2012/0112592 | A1* | 5/2012 | Yamada | H02K 1/2746 |
| | | | | 310/156.53 |
| 2013/0169097 | A1* | 7/2013 | Saban | H02K 1/278 |
| | | | | 310/152 |
| 2013/0169099 | A1* | 7/2013 | Saban | H02K 1/278 |
| | | | | 310/156.12 |
| 2014/0159534 | A1* | 6/2014 | Taniguchi | H02K 1/2746 |
| | | | | 310/156.53 |
| 2014/0184009 | A1* | 7/2014 | Taniguchi | H02K 1/2746 |
| | | | | 310/156.53 |
| 2015/0001984 | A1* | 1/2015 | Bradfield | H02K 3/493 |
| | | | | 310/216.069 |
| 2016/0172918 | A1* | 6/2016 | Hirotani | H02K 1/16 |
| | | | | 310/198 |
| 2016/0241095 | A1 | 8/2016 | Randria et al. | |
| 2017/0040853 | A1* | 2/2017 | Totaro | H02K 29/03 |
| 2017/0237324 | A1* | 8/2017 | Terasawa | H02K 1/165 |
| | | | | 310/216.001 |
| 2017/0264147 | A1* | 9/2017 | Inoue | H02K 1/165 |
| 2017/0331353 | A1* | 11/2017 | Alexander | H02K 1/265 |
| 2018/0212501 | A1* | 7/2018 | Mayor | H02K 17/185 |
| 2018/0226846 | A1* | 8/2018 | Tsuiki | H02K 1/165 |
| 2020/0076281 | A1 | 3/2020 | Yoshida et al. | |
| 2020/0119630 | A1* | 4/2020 | Asano | H02K 3/28 |
| 2020/0212734 | A1* | 7/2020 | Du | H02K 29/03 |
| 2021/0242732 | A1* | 8/2021 | Soma | H02K 15/03 |
| 2022/0014056 | A1* | 1/2022 | Pickett | H02K 1/2773 |

FOREIGN PATENT DOCUMENTS

| | | |
|---|---|---|
| JP | 2016-152771 | 8/2016 |
| JP | 2020-039207 | 3/2020 |

\* cited by examiner

F I G. 5

| No. | HALBACH ARRAY | TYPE OF WINDING | NUMBER OF POLES | NUMBER OF SLOTS | CENTRAL ANGLE α [°] OF MAIN MAGNETS | CENTRAL ANGLE β [°] OF SUB-MAGNETS | NUMBER OF SLOTS FACING TOWARD ONE MAIN MAGNET | NUMBER OF SLOTS FACING TOWARD ONE SUB-MAGNET | MAIN/SUB MAGNETS CENTRAL ANGLE (SURFACE AREA) RATIO |
|---|---|---|---|---|---|---|---|---|---|
| 1 | ○ | 1-TIME WINDING | 12 | 36 | 5 | 25 | 0.5 | 2.5 | 1:5.00 |
|  | ○ |  |  |  | 10 | 20 | 1 | 2 | 1:2.00 |
|  | ○ |  |  |  | 15 | 15 | 1.5 | 1.5 | 1:1.00 |
|  | ○ |  |  |  | 20 | 10 | 2 | 1 | 1:0.50 |
|  | ○ |  |  |  | 25 | 5 | 2.5 | 0.5 | 1:0.20 |
|  | × |  |  |  | 30 | 0 |  |  | 1:0.00 |
| 2 | ○ | 1-TIME WINDING | 10 | 30 | 6 | 30 | 1 | 2 | 1:5.00 |
|  | ○ |  |  |  | 12 | 24 | 1 | 2 | 1:2.00 |
|  | ○ |  |  |  | 18 | 18 | 1.5 | 1.5 | 1:1.00 |
|  | ○ |  |  |  | 24 | 12 | 2 | 1 | 1:0.50 |
|  | ○ |  |  |  | 30 | 6 | 2 | 1 | 1:0.20 |
|  | × |  |  |  | 45 | 0 |  |  | 1:0.00 |
| 3 | ○ | 1-TIME WINDING | 8 | 24 | 7.5 | 37.5 | 1 | 2 | 1:5.00 |
|  | ○ |  |  |  | 15 | 30 | 1 | 2 | 1:2.00 |
|  | ○ |  |  |  | 22.5 | 22.5 | 1.5 | 1.5 | 1:1.00 |
|  | ○ |  |  |  | 30 | 15 | 2 | 1 | 1:0.50 |
|  | ○ |  |  |  | 37.5 | 7.5 | 2 | 1 | 1:0.20 |
|  | × |  |  |  | 45 | 0 |  |  | 1:0.00 |
| 4 | ○ | 1-TIME WINDING | 6 | 18 | 10 | 50 | 0.5 | 2.5 | 1:5.00 |
|  | ○ |  |  |  | 20 | 40 | 1 | 2 | 1:2.00 |
|  | ○ |  |  |  | 30 | 30 | 1.5 | 1.5 | 1:1.00 |
|  | ○ |  |  |  | 40 | 20 | 2 | 1 | 1:0.50 |
|  | ○ |  |  |  | 50 | 10 | 2.5 | 0.5 | 1:0.20 |
|  | × |  |  |  | 60 | 0 |  |  | 1:0.00 |
| 5 | ○ | 1-TIME WINDING | 4 | 12 | 15 | 75 | 0.5 | 2.5 | 1:5.00 |
|  | ○ |  |  |  | 30 | 60 | 1 | 2 | 1:2.00 |
|  | ○ |  |  |  | 45 | 45 | 1.5 | 1 | 1:1.00 |
|  | ○ |  |  |  | 60 | 30 | 2 | 1 | 1:0.50 |
|  | ○ |  |  |  | 75 | 15 | 2 | 0 | 1:0.20 |
|  | × |  |  |  | 90 | 0 |  |  | 1:0.00 |
| 6 | ○ | 1-TIME WINDING | 2 | 6 | 30 | 150 | 0.5 | 2.5 | 1:5.00 |
|  | ○ |  |  |  | 60 | 120 | 1 | 2 | 1:2.00 |
|  | ○ |  |  |  | 90 | 90 | 1.5 | 1.5 | 1:1.00 |
|  | ○ |  |  |  | 120 | 60 | 2 | 1 | 1:0.50 |
|  | ○ |  |  |  | 150 | 30 | 2 | 0 | 1:0.20 |
|  | × |  |  |  | 180 | 0 |  |  | 1:0.00 |

FIG. 6

| No. | HALBACH ARRAY | TYPE OF WINDING | NUMBER OF POLES | NUMBER OF SLOTS | CENTRAL ANGLE α [°] OF MAIN MAGNETS | CENTRAL ANGLE β [°] OF SUB-MAGNETS | NUMBER OF SLOTS FACING TOWARD ONE MAIN MAGNET | NUMBER OF SLOTS FACING TOWARD ONE SUB-MAGNET | MAIN/SUB MAGNETS CENTRAL ANGLE (SURFACE AREA) RATIO |
|---|---|---|---|---|---|---|---|---|---|
| 7 | ○ | 2-TIME WINDING | 8 | 48 | 7.5 | 37.5 | | 5 | 1:5.00 |
| | ○ | | | | 15 | 30 | | 4 | 1:2.00 |
| | ○ | | | | 22.5 | 22.5 | | 3 | 1:1.00 |
| | ○ | | | | 26.5 | 18.5 | | | 1:0.70 |
| | ○ | | | | 30 | 15 | | 2 | 1:0.50 |
| | ○ | | | | 37.5 | 7.5 | | | 1:0.20 |
| | × | | | | 45 | | | 1 | 1:0.00 |
| 8 | ○ | 2-TIME WINDING | 6 | 36 | 10 | 50 | | 5 | 1:5.00 |
| | ○ | | | | 20 | 40 | | 4 | 1:2.00 |
| | ○ | | | | 30 | 30 | | 3 | 1:1.00 |
| | ○ | | | | 40 | 20 | | 2 | 1:0.50 |
| | ○ | | | | 50 | 10 | | | 1:0.20 |
| | × | | | | 60 | | | 1 | 1:0.00 |
| 9 | ○ | 2-TIME WINDING | 4 | 24 | 15 | 75 | | 5 | 1:5.00 |
| | ○ | | | | 30 | 60 | | 4 | 1:2.00 |
| | ○ | | | | 45 | 45 | | 3 | 1:1.00 |
| | ○ | | | | 60 | 30 | | 2 | 1:0.50 |
| | ○ | | | | 75 | 15 | | | 1:0.20 |
| | × | | | | 90 | | | 1 | 1:0.00 |
| 10 | ○ | 2-TIME WINDING | 2 | 12 | 30 | 150 | | 5 | 1:5.00 |
| | ○ | | | | 60 | 120 | | 4 | 1:2.00 |
| | ○ | | | | 90 | 90 | | 3 | 1:1.00 |
| | ○ | | | | 120 | 60 | | 2 | 1:0.50 |
| | ○ | | | | 150 | 30 | | | 1:0.20 |
| | × | | | | 180 | | | 1 | 1:0.00 |

FIG. 7

| No. | HALBACH ARRAY | TYPE OF WINDING | NUMBER OF POLES | NUMBER OF SLOTS | CENTRAL ANGLE α[°] OF MAIN MAGNETS | CENTRAL ANGLE β[°] OF SUB-MAGNETS | NUMBER OF SLOTS FACING TOWARD ONE MAIN MAGNET | NUMBER OF SLOTS FACING TOWARD ONE SUB-MAGNET | MAIN/SUB MAGNETS CENTRAL ANGLE (SURFACE AREA) RATIO |
|---|---|---|---|---|---|---|---|---|---|
| 11 | ○ | 3-TIME WINDING | 2 | 18 | 20 | 160 | 1 | 8 | 1:8.00 |
| | ○ | | | | 40 | 140 | 2 | 7 | 1:3.50 |
| | ○ | | | | 60 | 120 | 3 | 6 | 1:2.00 |
| | ○ | | | | 80 | 100 | 4 | 5 | 1:1.25 |
| | ○ | | | | 90 | 90 | 4.5 | 4.5 | 1:1.00 |
| | ○ | | | | 100 | 80 | 5 | 4 | 1:0.80 |
| | ○ | | | | 120 | 60 | 6 | 3 | 1:0.50 |
| | ○ | | | | 140 | 40 | 7 | 2 | 1:0.29 |
| | ○ | | | | 150 | 30 | 7.5 | 1.5 | 1:0.20 |
| | ○ | | | | 160 | 20 | 8 | 1 | 1:0.13 |
| | × | | | | 180 | 0 | 9 | 0 | 1:0.00 |
| 12 | ○ | 8-TIME WINDING | 2 | 48 | 15 | 165 | 2 | 22 | 1:11.00 |
| | ○ | | | | 30 | 150 | 4 | 20 | 1:5.00 |
| | ○ | | | | 45 | 135 | 6 | 18 | 1:3.00 |
| | ○ | | | | 60 | 120 | 8 | 16 | 1:2.00 |
| | ○ | | | | 75 | 105 | 10 | 14 | 1:1.40 |
| | ○ | | | | 90 | 90 | 12 | 12 | 1:1.00 |
| | ○ | | | | 97.5 | 82.5 | 13 | 11 | 1:0.85 |
| | ○ | | | | 105 | 75 | 14 | 10 | 1:0.71 |
| | ○ | | | | 112.5 | 67.5 | 15 | 9 | 1:0.60 |
| | ○ | | | | 120 | 60 | 16 | 8 | 1:0.50 |
| | ○ | | | | 127.5 | 52.5 | 17 | 7 | 1:0.41 |
| | ○ | | | | 135 | 45 | 18 | 6 | 1:0.33 |
| | ○ | | | | 150 | 30 | 20 | 4 | 1:0.20 |
| | ○ | | | | 165 | 15 | 22 | 2 | 1:0.09 |
| | × | | | | 180 | 0 | 24 | 0 | 1:0.00 |
| 13 | ○ | 6-TIME WINDING | 2 | 36 | 20 | 160 | 2 | 16 | 1:8.00 |
| | ○ | | | | 40 | 140 | 4 | 14 | 1:3.50 |
| | ○ | | | | 60 | 120 | 6 | 12 | 1:2.00 |
| | ○ | | | | 80 | 100 | 8 | 10 | 1:1.25 |
| | ○ | | | | 90 | 90 | 9 | 9 | 1:1.00 |
| | ○ | | | | 100 | 80 | 10 | 8 | 1:0.80 |
| | ○ | | | | 120 | 60 | 12 | 6 | 1:0.50 |
| | ○ | | | | 140 | 40 | 14 | 4 | 1:0.29 |
| | ○ | | | | 150 | 30 | 15 | 3 | 1:0.20 |
| | ○ | | | | 160 | 20 | 16 | 2 | 1:0.13 |
| | × | | | | 180 | 0 | 18 | 0 | 1:0.00 |
| 14 | ○ | 4-TIME WINDING | 2 | 24 | 30 | 150 | 2 | 10 | 1:5.00 |
| | ○ | | | | 60 | 120 | 4 | 8 | 1:2.00 |
| | ○ | | | | 90 | 90 | 6 | 6 | 1:1.00 |
| | ○ | | | | 120 | 60 | 8 | 4 | 1:0.50 |
| | ○ | | | | 150 | 30 | 10 | 2 | 1:0.20 |
| | × | | | | 180 | 0 | 12 | 0 | 1:0.00 |

ROTARY ELECTRIC MACHINE WITH ROTOR HAVING PERMANENT MAGNETS WITH RATIOS OF TOTAL SURFACE AREA AND A STATOR WITH TOOTH HAVING WIDE ENDS

CROSS-REFERENCE TO RELATED APPLICATION

This application is based upon and claims the benefit of priority from Japanese Patent Application No. 2020-163295 filed on Sep. 29, 2020, the contents of which are incorporated herein by reference.

BACKGROUND OF THE INVENTION

Field of the Invention

The present invention relates to a rotary electric machine equipped with a stator including an electromagnetic coil, and a rotor including permanent magnets.

Description of the Related Art

As is well known, a rotary electric machine is equipped with a stator that is positioned and fixed, and a rotor that rotates relatively with respect to the stator. An electromagnetic coil is provided in slots that are formed in the stator, in a manner so as to straddle over respective teeth portions. On the other hand, permanent magnets are retained on the rotor. In a motor, accompanying energization or supply of current to the electromagnetic coil, the electromagnetic coil is brought into a magnetic state, and an alternating magnetic field is formed. Repulsive forces or attractive forces are generated by the alternating magnetic field and the magnetic fields generated by the permanent magnets, whereby the rotor is rotated. In the case of an electric generator, by applying a rotational biasing force to the rotor, an induced current is generated in the electromagnetic coil.

In this type of rotary electric machine, as described in JP 2006-262603 A, JP 2007-028734 A, and JP 2016-152771 A, it is considered to arrange the permanent magnets that are provided on the rotor in a Halbach array. More specifically, the permanent magnets are provided in an array in which main magnets the magnetic fields of which are directed outward or inward in radial directions of the stator, and sub-magnets the magnetic fields of which are directed in a clockwise or counterclockwise manner in circumferential directions of the stator are arranged alongside one another in the circumferential direction. In this case, since the magnetic flux density becomes large, it is anticipated that efficiency will be improved in particular with a rotary electric machine that is small in scale.

SUMMARY OF THE INVENTION

When a Halbach array is adopted, the amount of magnetic flux from the main magnets becomes large. In the case that the stator is incapable of sufficiently receiving such an amount of magnetic flux, a so-called leakage flux (leakage of magnetic flux) occurs. The leakage of magnetic flux becomes a cause of generation of heat. Further, in the case that the rotary electric machine is used as an electric generator, an improvement in the amount of generated electrical power is hindered. In the foregoing manner, the leakage of magnetic flux leads to various inconveniences.

A principal object of the present invention is to provide a rotary electric machine in which it is possible to suppress generation of heat even if a Halbach array is adopted to thereby arrange permanent magnets.

Another object of the present invention is to provide a rotary electric machine in which it is possible to improve the amount of electrical power generated when the rotary electric machine is used as an electric generator.

According to an embodiment of the present invention, there is provided a rotary electric machine, including:

a stator including a yoke portion configured in an annular shape, and a plurality of teeth portions configured to protrude from a circumferential edge part of the yoke portion in a radial direction of the yoke portion, and in which an electromagnetic coil is provided in slots formed between adjacent ones of the teeth portions; and a rotor configured to retain a plurality of permanent magnets facing toward the teeth portions, wherein the plurality of permanent magnets are configured to include a same number of a first magnet in which a magnetic field thereof is oriented in a radially outward direction of the yoke portion, a second magnet adjacent to the first magnet and in which a magnetic field thereof is oriented in a clockwise direction of the yoke portion, a third magnet adjacent to the first magnet and in which a magnetic field thereof is oriented in a counterclockwise direction of the yoke portion, and a fourth magnet adjacent to the third magnet and in which a magnetic field thereof is oriented in a radially inward direction of the yoke portion, and wherein, when the plurality of permanent magnets are viewed in plan from above or below, a ratio of a total surface area of the first magnet and the fourth magnet to a total surface area of the second magnet and the third magnet is 1:0.2 to 1:1.

According to the present invention, the plurality of permanent magnets are arranged in a manner so as to form a Halbach array. Therefore, the amount of magnetic flux directed from the rotor (the permanent magnets) toward the stator (the electromagnetic coil) increases, and therefore, torque is enhanced.

In addition, regarding the plurality of permanent magnets, a ratio of a total surface area of the first magnet and the fourth magnet viewed in plan and having the directions of the magnetic fields in the radial directions of the stator or rotor, to a total surface area of the second magnet and the third magnet viewed in plan and having the directions of the magnetic fields in the circumferential directions of the stator or rotor, is set within a predetermined range. Thus, the teeth portions of the stator are capable of sufficiently receiving the magnetic flux of the permanent magnets. Therefore, it is possible to achieve a further enhancement in the torque.

In addition, by setting the ratio of surface areas as described above, the leakage of magnetic flux is reduced. As a result, interlinked magnetic flux and eddy currents of the electromagnetic coil are reduced. Therefore, it is possible to suppress generation of heat.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 5 is a chart showing a relationship between respective central angles of main magnets and sub-magnets at various pole numbers, and a number of base portions (number of slots) of teeth portions that face toward the main magnets or the sub-magnets;

FIG. 6 is a continuation of the chart showing the relationship between respective central angles of main magnets and sub-magnets at various pole numbers, and a number of base portions of teeth portions that face toward the main magnets or the sub-magnets;

FIG. 7 is a further continuation of the chart showing the relationship between respective central angles of main magnets and sub-magnets at various pole numbers, and a number of base portions of teeth portions that face toward the main magnets or the sub-magnets;

DESCRIPTION OF THE PREFERRED EMBODIMENTS

A preferred embodiment of a rotary electric machine according to the present invention will be presented and described in detail below with reference to the accompanying drawings.

Figure 1:
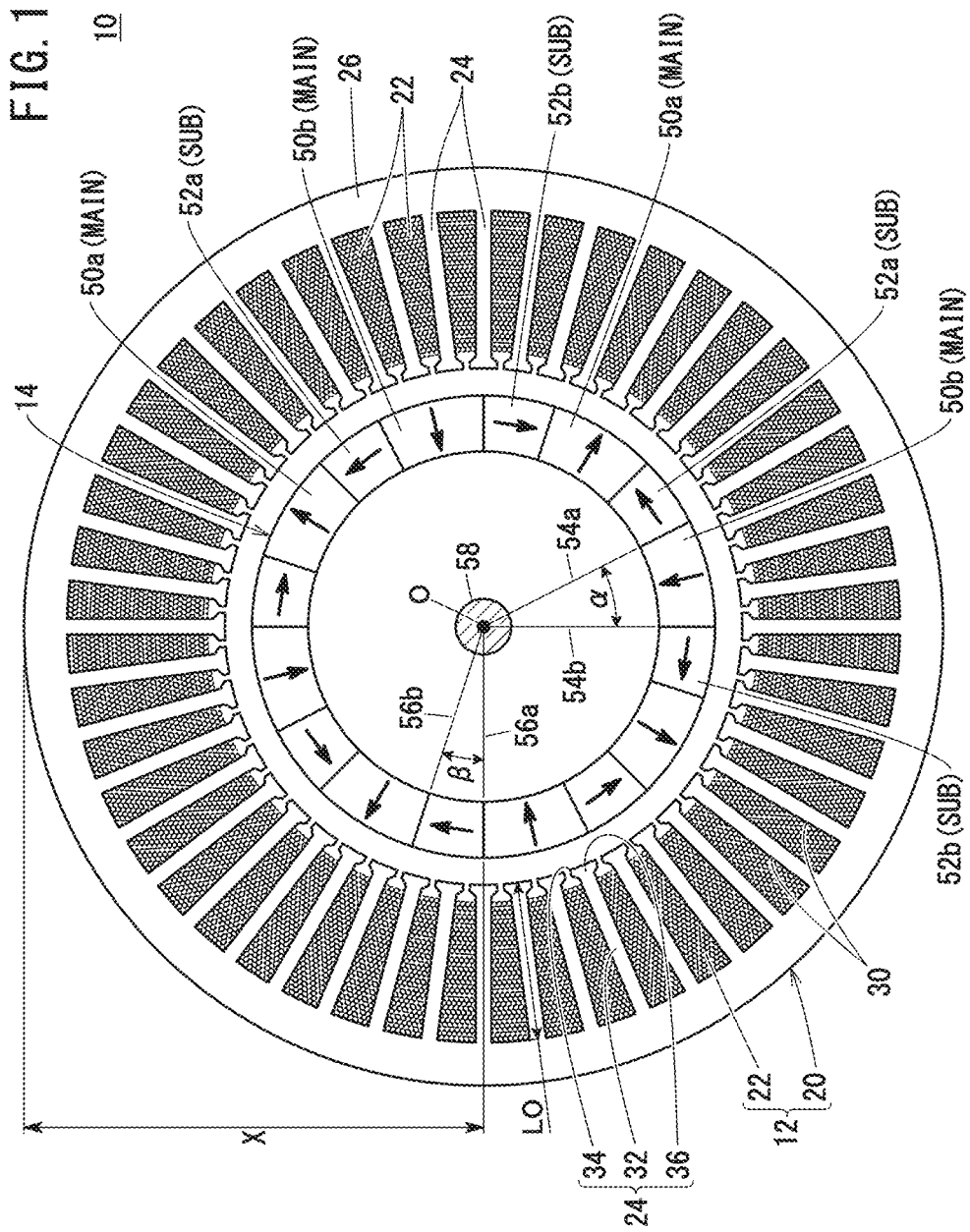
FIG. 1 is a schematic horizontal cross-sectional view of main components of a rotary electric machine according to an embodiment of the present invention.

FIG. 1 is a schematic horizontal cross-sectional view of main components of a rotary electric machine 10 according to a present embodiment. The rotary electric machine 10 includes a stator 12 having a substantially annular shape, and a rotor 14 disposed on an inner circumferential side of the stator 12. The rotary electric machine 10 constitutes a three-phase rotary electric machine (electric generator) having a u-phase, a v-phase, and a w-phase.

The stator 12 includes a stator core 20 and an electromagnetic coil 22. Among these elements, the stator core 20 is constituted, for example, by stacking magnetic bodies such as electromagnetic steel plates or the like. On the other hand, the electromagnetic coil 22 is constituted, for example, by winding a wire material made of copper around teeth portions 24 which are a part of the stator core 20.

At first, a description will be given concerning the stator 12. The stator core 20 is made up from a yoke portion 26 having an annular shape, and a plurality of the teeth portions 24 that protrude inwardly in a radial direction of the yoke portion 26 from an inner circumferential edge part of the yoke portion 26. In this case, an outer diameter of the stator core 20 (two times a distance X from a center O to the outer circumferential edge of the yoke portion 26) is set to 100 mm to 200 mm, and typically, to roughly 115 mm to 130 mm. The outer diameter is smaller in comparison with that of a general rotary electric machine 10. Stated otherwise, the rotary electric machine 10 according to the present embodiment is small in scale.

Slots 30 are formed between adjacent ones of the teeth portions 24. From the fact that the rotary electric machine 10 is a three-phase electric generator, the number of the slots 30 is typically set to a multiple of three. More specifically, the number of the slots 30, for example, is 3, 6, 12, 18, 24, 30, 36, 48 (3 slots, 6 slots, 12 slots, 18 slots, 24 slots, 30 slots, 36 slots, 48 slots) and the like. In the example shown in FIG. 1, the number of either one of the teeth portions 24 and the slots 30 is set to 48. Moreover, the number of poles (to be described later) is eight, so that ultimately, the rotary electric machine 10 is configured in the form of a so-called 8-pole 48-slot rotary electric machine.

Figure 2:
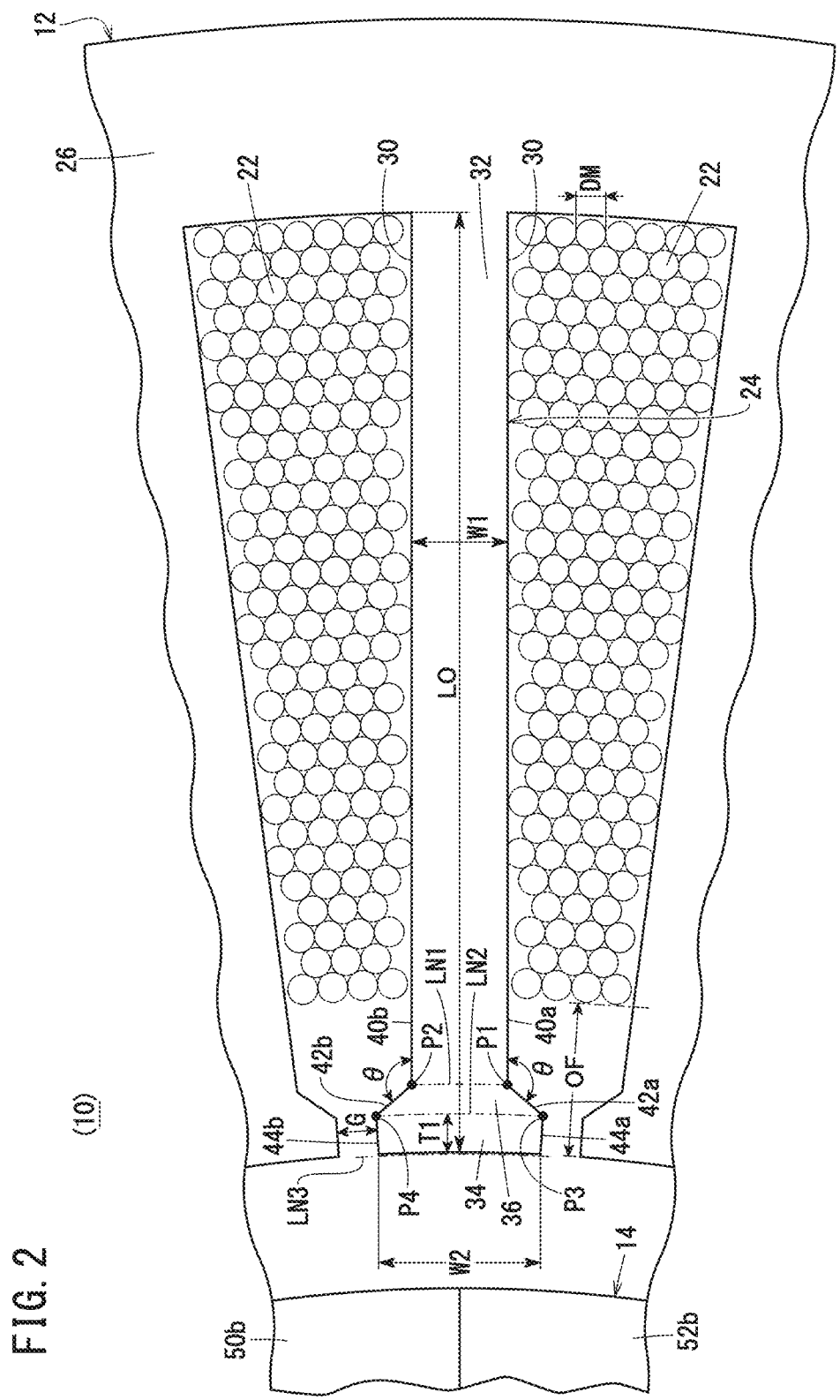
FIG. 2 is a partially enlarged horizontal cross-sectional view of the rotary electric machine shown in FIG. 1.

As shown in detail in FIG. 2, each of the individual teeth portions 24 includes a base portion 32 that extends radially along a radial direction of the stator core 20, a flange portion 34 provided at a distal end on the inner circumferential side, and an expanding portion 36 interposed between the base portion 32 and the flange portion 34. The base portion 32 has a first parallel side 40a and a second parallel side 40b, and a separation distance between the first parallel side 40a and the second parallel side 40b, or stated otherwise, a dimension W1 in a widthwise direction substantially perpendicular with respect to the radial direction of the stator core 20 is substantially constant.

The expanding portion 36 expands in a manner so as to gradually widen from the base portion 32 toward the flange portion 34, or stated otherwise, narrows in a tapered shape from the flange portion 34 toward the base portion 32. For this reason, the expanding portion 36 has a first inclined side 42a and a second inclined side 42b. The first inclined side 42a intersects at an angle of intersection θ with respect to the first parallel side 40a of the base portion 32. Further, the angle of intersection of the second inclined side 42b with respect to the second parallel side 40b is also θ. The angle of intersection θ is set to 108° to 130°, and more preferably, lies within a range of 120° to 125°. By setting the angle of intersection θ to lie within such a range, it is possible to reduce insofar as possible a total amount of copper loss and iron loss in the stator 12.

Moreover, a first virtual straight line LN1 drawn from an intersection P1 between the first parallel side 40a and the first inclined side 42a to an intersection P2 between the second parallel side 40b and the second inclined side 42b indicates an inner circumferential side end part of the base portion 32 as well as an outer circumferential side end part of the expanding portion 36.

A first radially directed side 44a and a second radially directed side 44b of the flange portion 34 are connected to the first inclined side 42a and the second inclined side 42b. The first radially directed side 44a and the second radially directed side 44b have a substantially linear shape, and extend mutually in parallel with each other. Hereinafter, a separation distance W2 between the first radially directed side 44a and the second radially directed side 44b is also referred to as a width W2 of the flange portion 34. It goes without saying that the width W2 of the flange portion 34 is greater than the width W1 of the base portion 32.

The width W2 is set in a manner so that, for example, a separation distance G between adjacent ones of the flange portions 34 is greater than a diameter DM of the wire material constituting the electromagnetic coil 22. Along therewith, a magnetic flux saturation at the flange portions 34 is reduced, and the magnetic flux received by the base portions 32 is increased. Accordingly, it is possible to achieve an enhancement in the torque. Further, as the material (electromagnetic steel plates or the like) of the stator core 20, it becomes possible to select magnetic bodies whose saturation magnetic flux density thereof is small. Therefore, it is possible to achieve a reduction in cost.

An outer circumferential side end part of the first radially directed side 44a (an inner circumferential side end part of the first inclined side 42a) is an intersection P3 between the first inclined side 42a and the first radially directed side 44a. Similarly, an outer circumferential side end part of the second radially directed side 44b (an inner circumferential side end part of the second inclined side 42b) is an intersection P4 between the second inclined side 42b and the second radially directed side 44b. A second virtual straight line LN2 drawn from the intersection P3 to the intersection P4 indicates an inner circumferential side end part of the expanding portion 36 as well as an outer circumferential side end part of the flange portion 34. Further, a third virtual straight line LN3 drawn from an inner circumferential side end part of the first radially directed side 44a to an inner circumferential side end part of the second radially directed side 44b is an inner circumferential side end part of the flange portion 34. According to the present embodiment, a distance T1 from the inner circumferential side end part to the outer circumferential side end part of the flange portion 34 defines the thickness of the flange portion 34. More specifically, the thickness T1 of the flange portion 34 is equivalent to the separation distance between the second virtual straight line LN2 and the third virtual straight line LN3.

The thickness T1 of the flange portion 34 is preferably set within a range of 0.2 mm to 2.0 mm, and more preferably, within a range of 0.3 mm to 1.1 mm. By setting the thickness T1 to lie within such a range, it is possible to reduce insofar as possible a total amount of copper loss and iron loss in the stator 12.

The distance from a connected location of the base portions 32 with the inner circumferential edge part of the yoke portion 26, to the inner circumferential side end part of the flange portions 34 is defined as a total length LO of the teeth portions 24 (see FIG. 1). The total length LO typically lies within a range of 40 mm to 45 mm. Further, when the total length LO is set to 100%, the total length of the base portions 32 is typically set to be greater than or equal to 96%. Stated otherwise, in this case, the distance from the inner circumferential side end part of the flange portions 34 to the inner circumferential side end part of the base portions 32 is less than or equal to 4% of the total length LO of the teeth portions 24.

According to the present embodiment, as noted previously, the electromagnetic coil 22 is constituted by the wire material which is made up from a metal conductor such as copper or the like being wound around the teeth portions 24. Although distributed winding is a preferable form of winding, concentrated winding may also be used. In the example shown in FIG. 1, so-called double winding is performed.

As shown in FIG. 2, a distal end position on the inner circumferential side of the electromagnetic coil 22 inside the slots 30 is offset toward the side of the yoke portion 26, and more specifically, toward the outer circumferential side. An offset amount OF, which is defined as a distance from the inner circumferential side end part of the flange portion 34 to the distal end position on the inner circumferential side of the electromagnetic coil 22, is preferably set to 5% to 11% of the total length LO of the teeth portions 24. For example, when the total length LO is 40 mm, a suitable offset amount OF is 2 mm to 4.4 mm. A more preferable percentage of the offset amount OF with respect to the total length LO is 5.6 to 10.3%.

In this instance, if the offset amount OF is less than 5% of the total length LO of the teeth portions 24, by such an amount, the number of times at which the electromagnetic coil 22 is wound becomes larger in quantity. In particularly, the volume of the electromagnetic coil 22 becomes large. Accordingly, since the amount of magnetic flux received from the permanent magnets of the rotor 14 becomes large in quantity, a concern arises in that the amount of heat generated by the electromagnetic coil 22 increases. Further, the amount of copper loss increases. On the other hand, if the offset amount OF is in excess of 11%, although the copper loss is small, since the exposed area of the base portions 32 becomes large, the iron loss becomes large and the amount of generated heat becomes high. Further, since the volume thereof becomes smaller as the number of times at which the electromagnetic coil 22 is wound becomes fewer, the output of the electromagnetic coil 22 is reduced.

Moreover, when the total length LO of the teeth portions 24 is 40 mm to 45 mm, the specific distance from the inner circumferential side end part of the base portion 32 (the outer circumferential side end part of the expanding portion 36), and namely, the first virtual straight line LN1, to the distal end position on the inner circumferential side of the electromagnetic coil 22 is on the order of 1 to 3 mm.

A description will now be given concerning the rotor 14. As shown in FIG. 1, the rotor 14 includes, as a plurality of permanent magnets, first magnets 50a, second magnets 52a, third magnets 52b, and fourth magnets 50b. In FIG. 1, the arrows shown in the first magnets 50a to the fourth magnets 50b indicate the directions of the magnetic fields.

As can be understood from FIG. 1, the direction of the magnetic field of the first magnets 50a is in a radial outward direction of the rotor 14 and the stator core 20, and the direction of the magnetic field of the fourth magnets 50b is in a radial inward direction of the rotor 14 and the stator core 20. Further, the direction of the magnetic field of the second magnets 52a is in a circumferential counterclockwise direction of the rotor 14 and the stator core 20, and the direction of the magnetic field of the third magnets 52b is in a circumferential clockwise direction of the rotor 14 and the stator core 20. More specifically, the directions of the magnetic fields of the first magnet 50a and the fourth magnet 50b are in mutually opposite directions to each other, and similarly, the directions of the magnetic fields of the second magnet 52a and the third magnet 52b are also in mutually opposite directions to each other.

The first magnet 50a to the fourth magnet 50b are arranged in such order alongside one another in a circumferential clockwise direction of the rotor 14. In this case, four combinations (sets) of one group of the first magnet 50a to the fourth magnet 50b are formed along the circumferential direction, thereby forming a Halbach array. Hereinafter, in the case it is unnecessary to distinguish between the first magnet 50a and the fourth magnet 50b, and the second magnet 52a and the third magnet 52b, the first magnet 50a and the fourth magnet 50b may be collectively referred to as "main magnets," and the second magnet 52a and the third magnet 52b may be collectively referred to as "sub-magnets".

In this case, the numbers of the first magnet 50a, the second magnet 52a, the third magnet 52b, and the fourth magnet 50b are four, respectively. More specifically, the rotor 14 retains the same number of the first magnets 50a to the fourth magnets 50b.

According to the present embodiment, a number of groups is regarded as a number of sets, and two times the number of sets is regarded as a number of poles. More specifically, a combination of one of the main magnets in which the direction of the magnetic field is in a radial direction of the rotor 14 and the stator core 20, and one of the sub-magnets adjacent to the main magnet and in which the direction of the magnetic field is in a circumferential direction of the rotor 14 and the stator core 20 is counted as one pole. Accordingly, in the rotary electric machine 10 shown in FIG. 1, the number of sets is four, and the number of poles is eight.

As shown in FIG. 1, when the rotary electric machine 10 is viewed in plan from above (or below), the surface areas of the first magnet 50a and the fourth magnet 50b are equivalent to each other, and the surface areas of the second magnet 52a and the third magnet 52b are also equivalent to each other. Moreover, in FIG. 1, although the surface areas of the sub-magnets are shown to be smaller than the surface areas of the main magnets, the surface areas of the first magnet 50a to the fourth magnet 50b may all be the same. More specifically, when the total surface area of the eight main magnets is indicated by S14, and the total surface area of the eight sub-magnets is indicated by S23, S23 is set to be 0.2 times to 1 times that of S14. That is, a ratio of S14 and S23 is represented by a following formula (A).

$$S14:S23=1:0.2 \text{ to } 1:1 \quad (A)$$

In the case that the foregoing condition is satisfied, a central angle α formed by a first radius 54a drawn at one end (on a side in the counterclockwise direction), and a second radius 54b drawn at another end (on a side in the clockwise direction) in the circumferential direction of the main magnets is expressed by a following formula (1). It is a matter of course that the center O, which is the starting point of the first radius 54a and the second radius 54b, is the center of rotation of the rotor 14.

$$(360/\text{number of poles}) \times \tfrac{1}{2} \leq \alpha \leq (360/\text{number of poles}) \times \tfrac{5}{6} \quad (1)$$

In the rotary electric machine 10 illustrated in FIG. 1, as has been discussed previously, the number of poles is eight. Accordingly, when 8 is substituted for the "number of poles" in the formula (1), the central angle α lies within a range of 22.5° to 37.5°.

On the other hand, a central angle β formed by a third radius 56a drawn at one end (on a side in the counterclockwise direction), and a fourth radius 56b drawn at another end (on a side in the clockwise direction) in the circumferential direction of the sub-magnets is expressed by a following formula (2).

$$(360/\text{number of poles}) \times \tfrac{1}{6} \leq \beta \leq (360/\text{number of poles}) \times \tfrac{1}{2} \quad (2)$$

When the number of poles is eight, the central angle β is obtained by substituting 8 for the "number of poles" in the formula (2). More specifically, in this case, the central angle β lies within a range of 7.5° to 22.5°.

Figure 3:
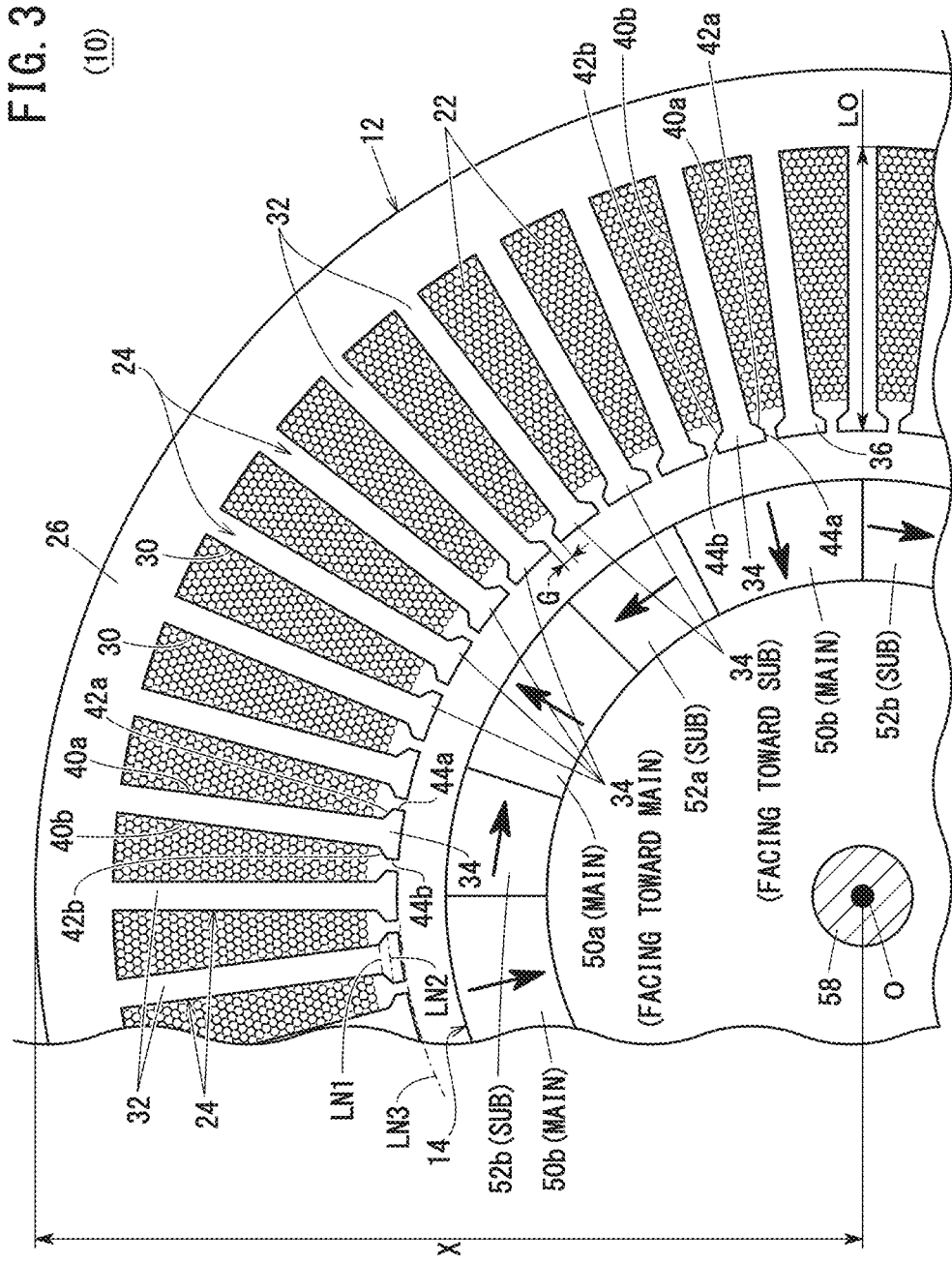
FIG. 3 is a partially enlarged horizontal cross-sectional view of the rotary electric machine shown in FIG. 1.

The first magnets 50a to the fourth magnets 50b face toward the base portions 32 via the flange portions 34 of the teeth portions 24. In the example shown in FIG. 1 in which the number of poles is eight, and as shown in an enlarged manner in FIG. 3, the average number of the base portions 32 facing toward one of the main magnets, and the average number of the base portions 32 facing toward one of the sub-magnets is preferably 1.5 to 5, and 0.5 to 3, respectively. The same applies when the number of poles is four or six. In this instance, when the base portions 32 are positioned on a boundary line between the main magnets and the sub-magnets, the base portions 32 are counted as facing toward the main magnets.

Moreover, the average number of the base portions 32 facing toward one of the main magnets, and the average number of the base portions 32 facing toward one of the sub-magnets is set corresponding to the number of poles. For example, when the number of poles is 10 or 12, the average number of the base portions is preferably set to 1.5 to 2.5, and 0.5 to 1.5, respectively. Further, when the number of poles is two, the average number of the base portions is preferably set to 1.5 to 20, and 0.5 to 12, respectively.

More specifically, in the case that the number of poles is 2 to 12, preferably, the average number of the base portions 32 facing toward one of the main magnets, and preferably, the average number of the base portions 32 facing toward one of the sub-magnets lie within a range of 1.5 to 20, and 0.5 to 12, respectively.

The first magnets 50a to the fourth magnets 50b which are configured in the manner described above are retained by the rotor 14 in a manner so that the adjacent magnets are placed in contact with each other.

The rotor 14 includes a rotating shaft 58. The rotating shaft 58 is connected to a non-illustrated rotation biasing mechanism, and rotates under a biasing action of the rotation biasing mechanism. Of course, in following relation to such rotation, the first magnets 50a to the fourth magnets 50b move in a circling manner.

The rotary electric machine 10 according to the present embodiment is constructed basically as described above. Next, a description will be given concerning operations and advantageous effects thereof.

In the case that the rotary electric machine 10 is used as an electric generator, the rotating shaft 58 is rotated by the rotation biasing mechanism. Along therewith, the first magnets 50a to the fourth magnets 50b move in a circling manner around the inner circumferential side of a virtual circle formed by connecting the inner circumferential side ends of the flange portions 34. Furthermore, due to such circling motion, an induced current is generated in the electromagnetic coil 22. By taking out the induced current to the exterior of the rotary electric machine 10, the induced current can be used as a power source for driving predetermined machinery or equipment.

Figure 4:
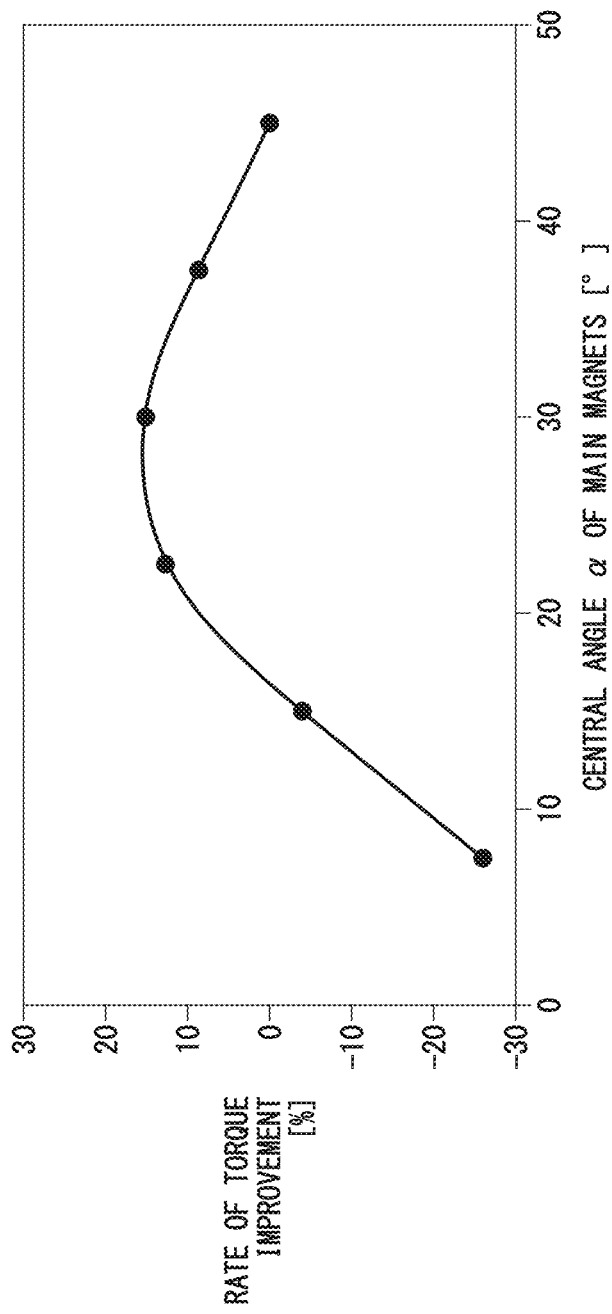
FIG. 4 is a graph showing a relationship between a central angle of main magnets, and a percentage of a torque of the rotary electric machine with respect to a reference value thereof.

In the foregoing manner, the first magnets 50a to the fourth magnets 50b are arranged alongside one another in a manner so that the adjacent magnets are placed in contact with each other. Therefore, the number and individual volumes of the first magnets 50a to the fourth magnets 50b can be maximized. In addition, in this case, since the Halbach array is formed by repeating the arrangement of the first magnets 50a to the fourth magnets 50b in the circumferential direction, the magnetic field strength from the rotor 14 (the first magnets 50a to the fourth magnets 50b) toward the stator 12 (the electromagnetic coil 22) becomes large. Moreover, the total surface area of the main magnets or the individual central angles α, and the total surface area of the sub-magnets or the individual central angles β are set appropriately. Combined with the aforementioned points, as shown in FIG. 4 to be discussed later, the torque can be increased.

In addition, the average number of the base portions 32 facing toward one of the main magnets (the first magnets 50a or the fourth magnets 50b), and the average number of the base portions 32 facing toward one of the sub-magnets (the second magnets 52a or the third magnets 52b) are set appropriately. More specifically, in the example shown in FIG. 1 in which the number of poles is eight, the average number of the base portions is 1.5 to 2.5, and 0.5 to 1.5, respectively (see FIG. 3). This also contributes to an enhancement in the torque. Moreover, due to this feature, since the leakage of magnetic flux is reduced, interlinked magnetic flux of the electromagnetic coil 22 is reduced. As a result, an advantage is obtained in that eddy currents in the electromagnetic coil 22 are reduced, and generation of heat in the electromagnetic coil 22 is suppressed.

Furthermore, in the teeth portions 24, the angle of intersection θ between the base portions 32 and the expanding portions 36 and the thickness T1 of the flange portions 34, and the offset amount OF of the electromagnetic coil 22 with respect to the teeth portions 24 are set appropriately. Therefore, since the total value of the iron loss and the copper loss in the stator 12 can be reduced insofar as possible, it is possible to suppress generation of heat in the stator 12.

Further, by appropriately setting the offset amount OF, it is possible to increase the output as an electric generator while reducing leakage of magnetic flux. Consequently, for example, it is possible to prevent the teeth portions 24 and the electromagnetic coil 22 from causing a local rise in temperature. Accordingly, deterioration of the material (the electromagnetic steel plates or the like) of the stator core 20 or the material (copper or the like) of the electromagnetic coil 22 due to such a rise in temperature is suppressed.

Additionally, in this case, there is no need to form slits or provide any members in the interior of the rotary electric machine 10. Accordingly, it is possible to obtain the rotary electric machine 10 by means of a simple operation, and the rotary electric machine 10 can be made smaller in scale and lightweight. In addition, a rise in cost is avoided.

In the foregoing manner, according to the present embodiment, it is possible to cause an enhancement in torque while suppressing generation of heat in the rotary electric machine 10, and furthermore, it is possible to improve the amount of power generated when used as an electric generator.

The present invention is not particularly limited to the above-described embodiment, and various modifications can be adopted therein without departing from the essence and gist of the present invention.

For example, instead of winding a wire material around the teeth portions 24, the electromagnetic coil 22 may be configured by inserting leg portions made of a metal conductor and having a substantially U-shape into the slots 30, as shown in FIG. 1 of JP 2020-039207 A.

Further, the rotary electric machine 10 may be made to function as a motor. In this case, an alternating current may be applied to the electromagnetic coil 22 from an external power source.

Exemplary Embodiment 1

(1) Central Angle α of Main Magnets, Central Angle β of Sub-Magnets

The average torque was determined by way of simulation, in relation to a rotary electric machine having 8 poles and 48 slots, wherein the central angle α formed by the main magnets differed from each other. For purposes of comparison, the average torque was also calculated for a 48-slot rotary electric machine that was not equipped with sub-magnets and in which eight main magnets were arranged only along the circumferential direction (i.e., a Halbach array was not formed). The results are shown in FIG. 4 as a graph in which the central angles α of the main magnets are depicted on the horizontal axis, and the rate of torque improvement is depicted on the vertical axis, with α=45° serving as a reference (0%). It should be noted that α=45° indicates a situation in which the rotary electric machine is equipped with only eight main magnets. More specifically, in this case, the central angle α of the main magnets is 45°, which is obtained by dividing 360° by 8.

From FIG. 4, it is clear that the torque is increased by a rotary electric machine in which the central angle α of the main magnets is 22.5° to 37.5° in comparison with a rotary electric machine (one having a central angle α of) 45° in which a Halbach array is not formed. In this case, the central angle β of the sub-magnets lies within a range of 22.5° to 7.5°.

Further, when an 8-pole rotary electric machine in which the central angle α of one of the main magnets is 22.5° to 37.5°, and the central angle β of one of the sub-magnets is 22.5° to 7.5° is viewed in plan, a ratio of the total surface area of the eight main magnets S14 to the total surface area of the eight sub-magnets S23 is S14:S23=1:1 to 1:0.2.

Moreover, when the number of poles is increased or decreased, the number (or the number of sets) of the main magnets and the sub-magnets increases or decreases, and therefore, the preferable range for the central angles α and β differs depending on the number of poles. In this case as well, the ratio of the total surface area of all the main magnets S14 to the total surface area of all the sub-magnets S23 should preferably lie within a range of S14:S23=1:1 to 1:0.2. On the basis of the aforementioned features, the following formulas (1) and (2) are derived.

$$(360/\text{number of poles}) \times \tfrac{1}{2} \leq \alpha \leq (360/\text{number of poles}) \times \tfrac{5}{6} \qquad (1)$$

$$(360/\text{number of poles}) \times \tfrac{1}{6} \leq \beta \leq (360/\text{number of poles}) \times \tfrac{1}{2} \qquad (2)$$

Exemplary Embodiment 2

(2) Average Number of Base Portions Facing Toward Main Magnets and Sub-Magnets

As noted previously, the number of the slots 30 is set to be a multiple of three. On the other hand, the number of poles is a multiple of two, and typically, is an even number between 2 and 12. In FIGS. 5 to 7, there is collectively shown a chart in which the number of the base portions 32 facing toward one of the main magnets and one of the sub-magnets are indicated when the central angles α and β are variously changed under such conditions. The portions of the chart surrounded by the thick frames indicate ranges in which the ratio S14:S23 satisfies the above formula (A).

From FIGS. 5 to 7, it can be understood that, when S14:S23 lies within a range of 1:1 to 1:0.2, the minimum numbers of the base portions 32 facing toward one of the main magnets and one of the sub-magnet are 1.5 and 0.5, respectively. Further, the maximum numbers of the base portions 32 facing toward one of the main magnets and one of the sub-magnets are 20 and 12, respectively. For the reasons discussed above, the numbers of the base portions 32 facing toward one of the main magnets and one of the sub-magnets preferably lie within a range of 1.5 to 20 and a range of 0.5 to 12, respectively.

From FIGS. 5 to 7, it can be recognized that the suitable numbers for the base portions 32 facing toward one of the main magnets and one of the sub-magnets vary depending on the number of poles. More specifically, when the number of poles is 10 or 12, the suitable numbers are 1.5 to 2.5, and 0.5 to 1.5, and when the number of poles is 4, 6, or 8, the suitable numbers are 1.5 to 5, and 0.5 to 3. Furthermore, when the number of poles is 2, the suitable numbers are 1.5 to 20, and 0.5 to 12.

Exemplary Embodiment 3

(3) Angle of Intersection θ between First Parallel Side 40a and First Inclined Side 42a (Second Parallel Side 40b and Second Inclined Side 42b)

In an 8-pole 48-slot rotary electric machine, the specific iron loss and the specific copper loss when the angle of intersection θ shown in FIG. 2 was changed in various ways were obtained by way of simulation. The respective results thereof are shown as graphs in FIGS. 8 and 9. In this instance, with a time when the angle of intersection θ is 105° being used as a reference, the specific iron loss and the specific copper loss are shown as percentages of the amounts by which they are raised or lowered. When the percentage is positive, it signifies a rising situation, whereas when the percentage is negative, it signifies a falling situation.

Figure 8:
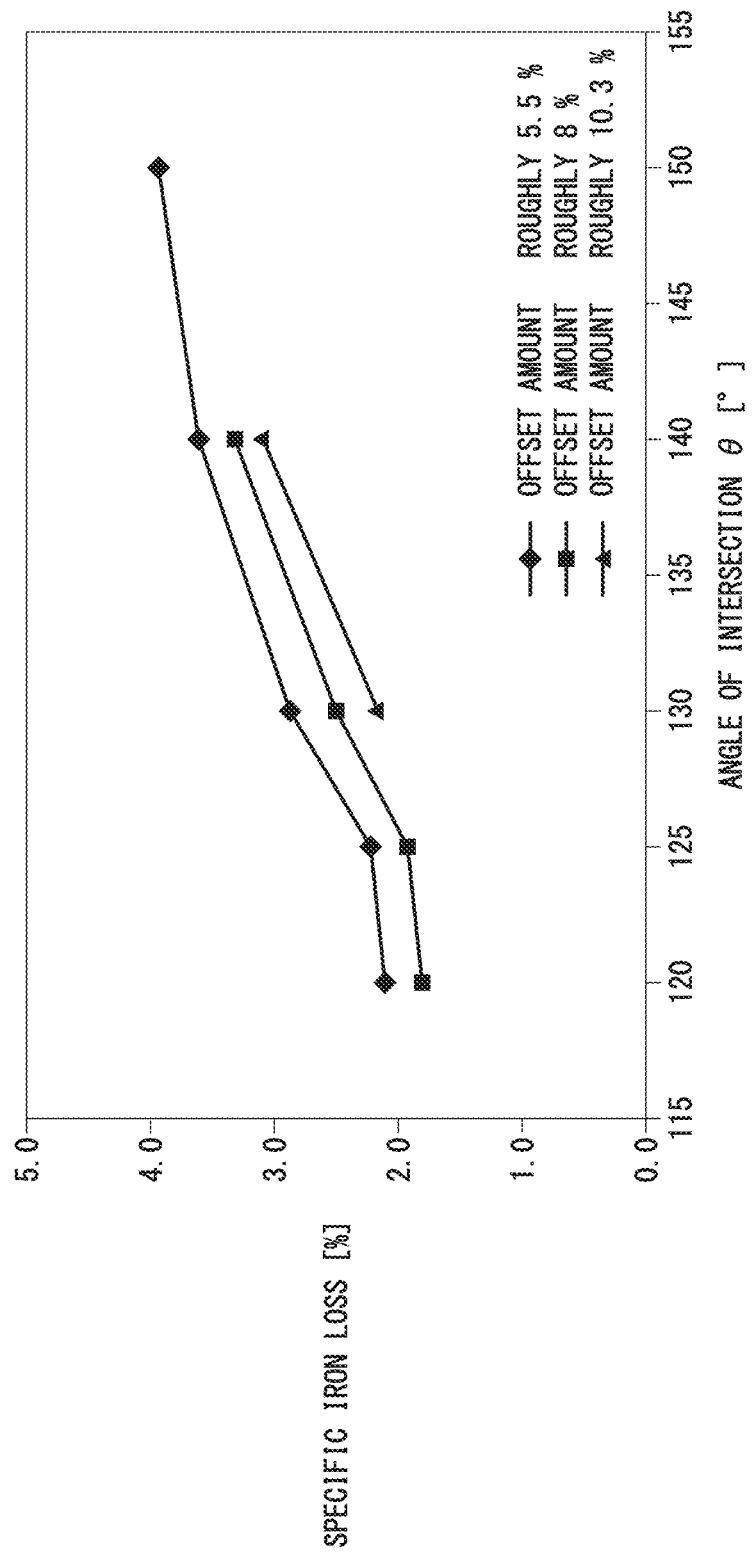
FIG. 8 is a graph showing a relationship between the angle of intersection between the base portions and the expanding portions in the teeth portions, and a percentage of iron loss (specific iron loss) with respect to a reference value thereof.
Figure 9:
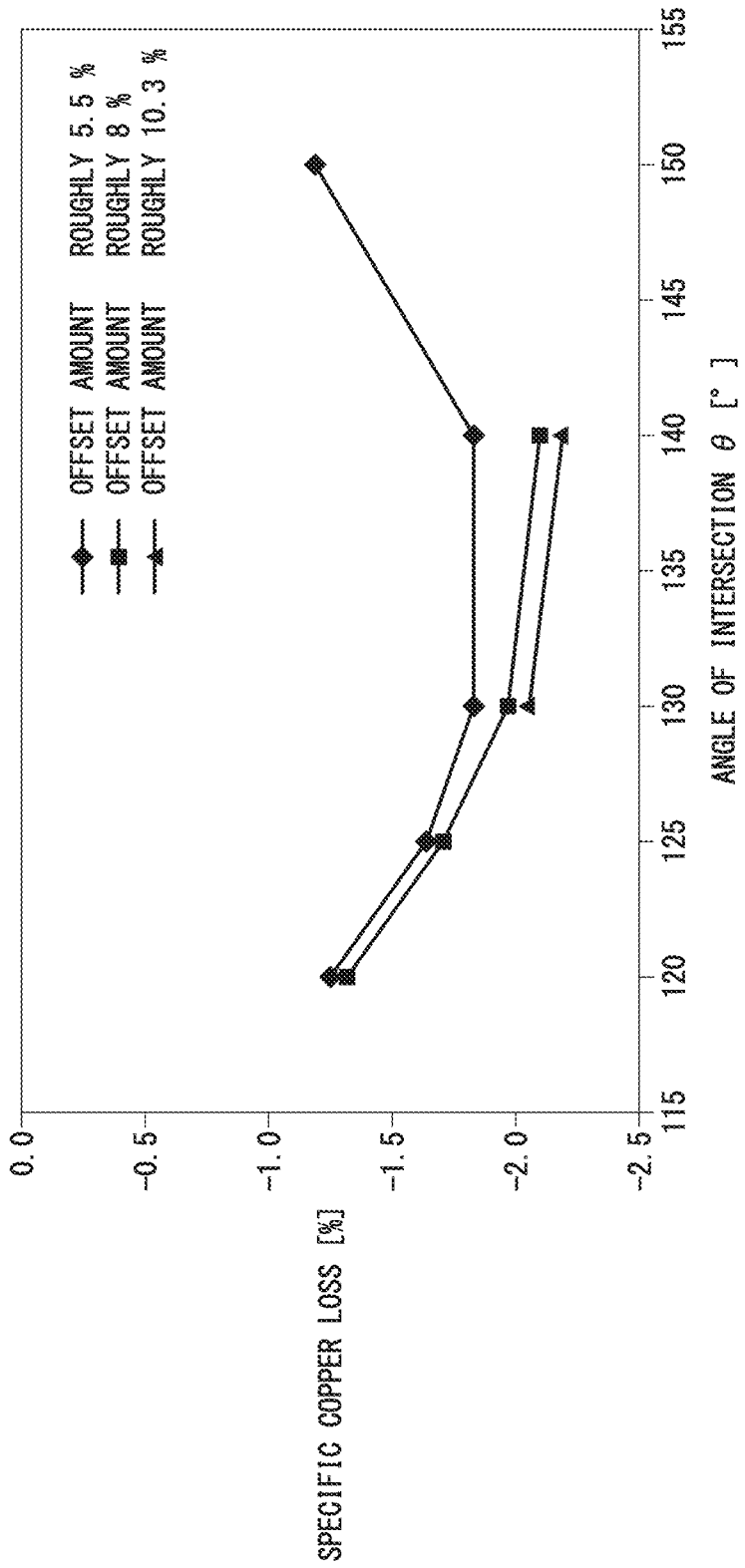
FIG. 9 is a graph showing a relationship between the angle of intersection, and a percentage of copper loss (specific copper loss) with respect to a reference value thereof.

From FIGS. 8 and 9, it can be understood that the larger the angle of intersection θ becomes, the iron loss becomes larger, whereas the copper loss becomes smaller. The respective plot points of "♦", "■", and "▲" shown in FIGS. 8 and 9 indicate situations in which the percentage of the offset amount OF (see FIG. 2) with respect to the total length LO of the teeth portions 24 is roughly 5.5%, roughly 8%, and roughly 10.3%. In this instance, the specific distances between the inner circumferential side end portion of the base portions 32 and the inner circumferential side end portion of the electromagnetic coil 22 are 1 mm, 2 mm, and 3 mm, respectively.

Figure 10:
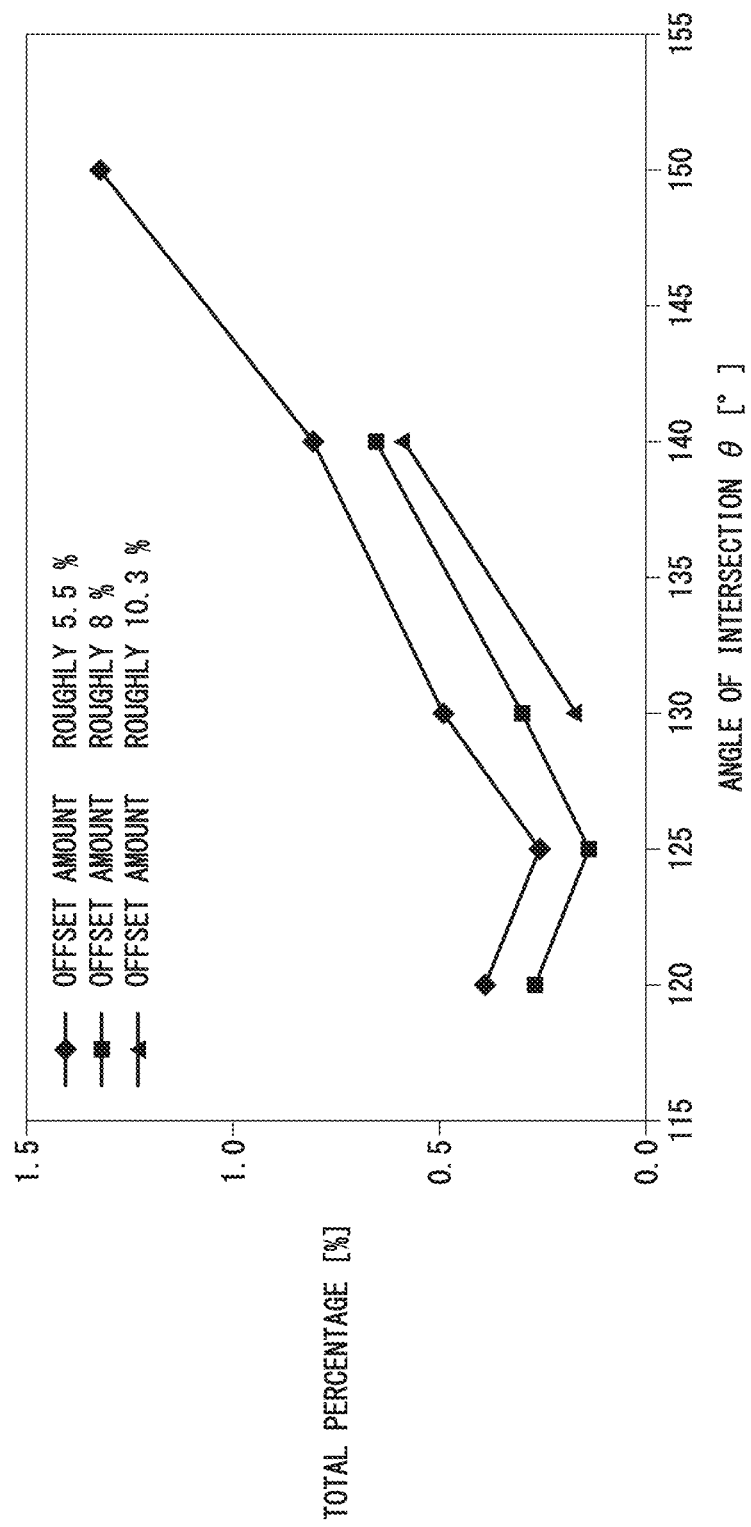
FIG. 10 is a graph showing a relationship between the angle of intersection, and a percentage of a total value of the iron loss and the copper loss.

FIG. 10 is a graph showing a relationship between the angle of intersection θ, and a total percentage of the specific iron loss and the specific copper loss. In this instance, the total percentage indicates a percentage of a total simulation value of the iron loss and the copper loss when the total simulation value of the iron loss and the copper loss when the angle of intersection θ is 105° is used as a reference, and when the angle of intersection θ is any other value apart therefrom.

With reference to FIG. 10, in the case that the angle of intersection θ is 108° to 130°, it can be understood that, even in the case that the percentage of the offset amount OF is any one of 5.5%, roughly 8%, and roughly 10.3%, the percentage (total percentage) of the iron loss and the copper loss is comparatively small. For the reasons discussed above, the angle of intersection θ preferably lies within a range of 108° to 130°. Moreover, the angle of intersection θ more preferably lies within a range of 120° to 125°. This is because, within such a range, the copper loss can be made as small as possible, while on the other hand, the iron loss becomes sufficiently small.

Exemplary Embodiment 4

(4) Thickness T1 of Flange Portions 34

In an 8-pole 48-slot rotary electric machine, the specific iron loss, the specific copper loss, and the total percentage thereof when the offset amount OF is set to 2 mm, and the thickness T1 (see FIG. 2) of the flange portions 34 is changed in various ways were obtained by way of simulation. The results thereof are shown as a graph in FIG. 11. Moreover, the thickness T1=0 implies a situation in which the first radially directed side 44a and the second radially directed side 44b that are connected to each of the first inclined side 42a and the second inclined side 42b do not exist, or stated otherwise, in which the flange portions 34 do not exist. The iron loss, the copper loss, and a total simulation value of both the iron loss and the copper loss at this time are used as a reference, regarding the specific iron loss, the specific copper loss, and the total percentage thereof.

Figure 11:
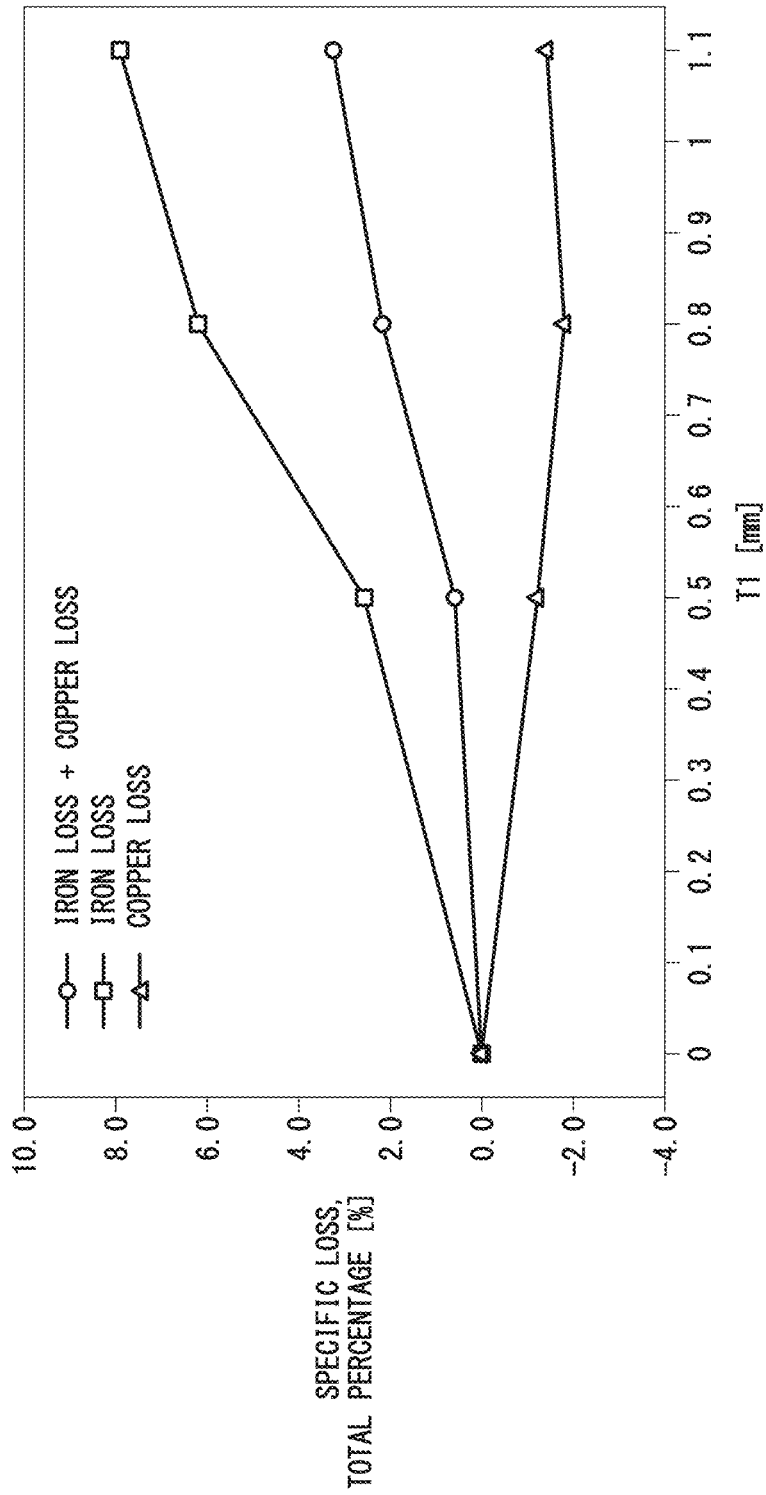
FIG. 11 is a graph showing a relationship between a thickness of a flange portion, and a percentage of the iron loss, the copper loss, and a total value of the iron loss and the copper loss with respect to a reference value thereof.

More specifically, in the case of the specific iron loss and the specific copper loss, the vertical axis in FIG. 11 shows as a percentage the degree to which the specific iron loss and the specific copper loss are raised or lowered, with a time when the thickness T1=0 being used as a reference. When the percentage is positive, it signifies a rising situation, whereas when the percentage is negative, it signifies a falling situation. Further, in the case of the total percentage, it indicates a proportion between a total simulation value of the iron loss and the copper loss when the thickness T1=0 and a total simulation value of the iron loss and the copper loss when the thickness T1 is any other value apart therefrom.

As can be recognized from FIG. 11, the iron loss increases as the thickness T1 of the flange portions 34 increases. In order to avoid such a condition, it is preferable to reduce the thickness T1 insofar as possible. However, if the thickness T1 is made excessively small, the volume of the flange portions 34, which are the portions that receive the magnetic flux from the first magnets 50a to the fourth magnets 50b, becomes small. Stated otherwise, it becomes difficult for the teeth portions 24 to receive the magnetic flux from the first magnets 50a to the fourth magnets 50b (primarily, the first magnets 50a and the fourth magnets 50b), and as a result, leakage of magnetic flux increases. Therefore, it is preferable for the thickness T1 to be set within a range of 0.2 mm to 2.0 mm. A more preferable range for the thickness T1 is 0.3 mm to 1.1 mm.

Exemplary Embodiment 5

(5) Offset Amount OF

Figure 12:
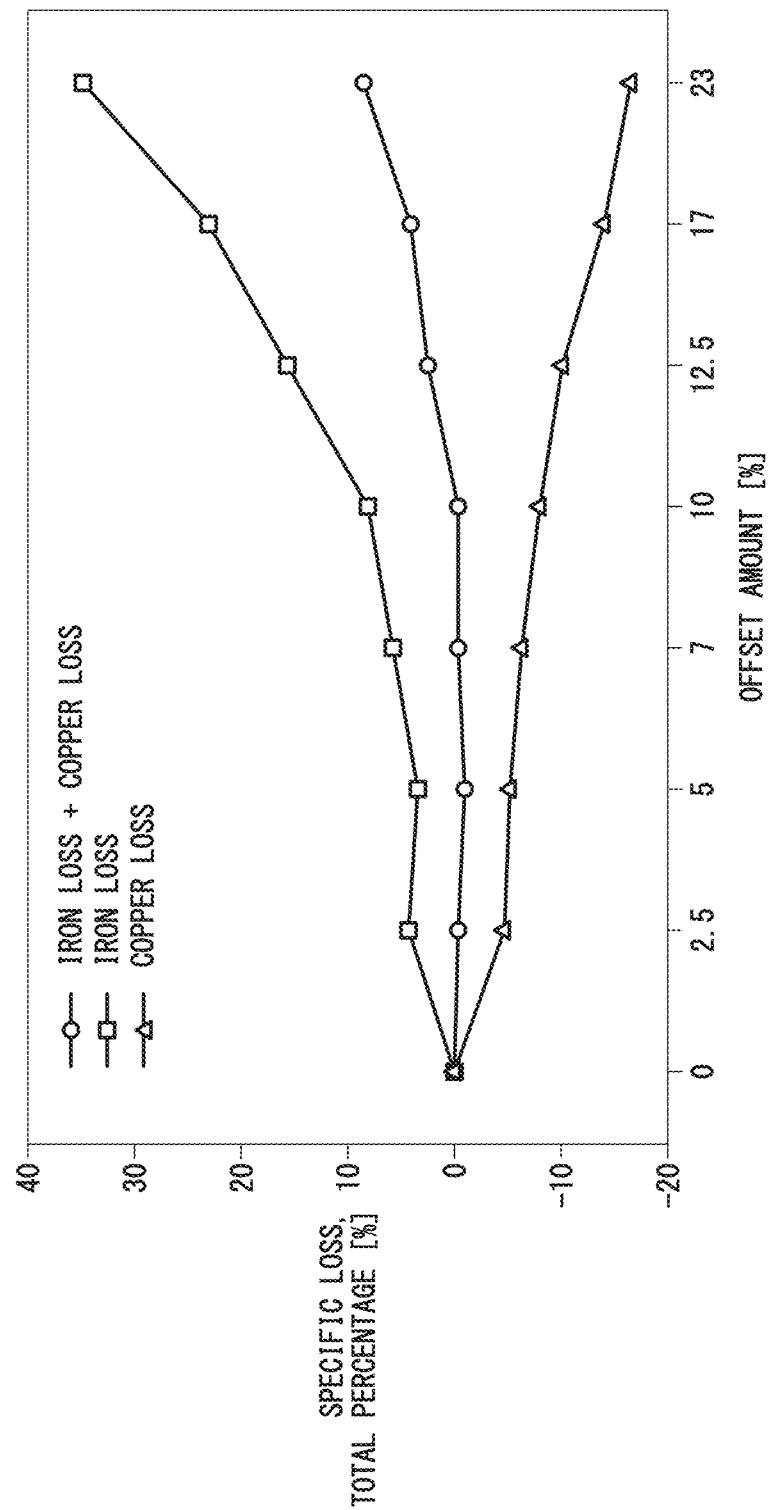
FIG. 12 is a graph showing a relationship between an offset amount of an electromagnetic coil, and a percentage of the iron loss, the copper loss, and a total value of the iron loss and the copper loss with respect to a reference value thereof.

In an 8-pole 48-slot rotary electric machine, the iron loss, the copper loss, and the total percentage thereof when the offset amount OF of the electromagnetic coil 22 was changed in various ways were obtained by way of simulation. FIG. 12 is a graph showing the iron loss, the copper loss, and a total simulation value thereof when the offset amount OF is 0%, and the iron loss, the copper loss, and a total simulation value thereof when the offset value OF is any other value apart therefrom. More specifically, in this case, the offset amount OF=0% is used as a reference. Moreover, on the horizontal axis of FIG. 12, the offset amount OF is shown as a percentage with respect to the total length LO of the teeth portions 24. Accordingly, the "offset amount OF=0%" indicates a situation in which the inner circumferential side end part of the electromagnetic coil 22 is positioned at the inner circumferential side end part (the first virtual straight line LN1) of the base portions 32.

From FIG. 12, it can be recognized that, as the percentage of the offset amount OF becomes larger, the copper loss decreases while the iron loss increases, and when the percentage of the offset amount OF exceeds 11%, the total value of the copper loss and the iron loss significantly increases. From this result, it can be said that a preferable percentage of the offset amount OF with respect to the total length LO of the teeth portions 24 is 5 to 11%. Further, from the fact that the total amount of the copper loss and the iron loss becomes small, it is understood that 5.6 to 10.3% is more preferable, and that 7 to 8% is particularly preferable.

What is claimed is:

1. A rotary electric machine, comprising:
a stator including a stator core including a plurality of teeth portions; and
a rotor configured to retain a plurality of permanent magnets facing toward the teeth portions,
wherein
the stator core includes
a yoke portion configured in an annular shape,
the plurality of teeth portions configured to protrude from a circumferential edge part of the yoke portion in a radial direction of the yoke portion, and
a slot formed between adjacent ones of the teeth portions,
the stator includes an electromagnetic coil provided in the slots,
the plurality of permanent magnets are configured to include a same number of
a first magnet in which a magnetic field of the first magnet is oriented in a radially outward direction of the yoke portion,
a second magnet adjacent to the first magnet and in which a magnetic field of the second magnet is oriented in a clockwise direction of the yoke portion,
a third magnet adjacent to the first magnet and in which a magnetic field of the third magnet is oriented in a counterclockwise direction of the yoke portion, and
a fourth magnet adjacent to the third magnet and in which a magnetic field of the fourth magnet is oriented in a radially inward direction of the yoke portion,
an outer diameter of the stator core is set to 115 mm to 130 mm,
a total length of the teeth portions lies within a range 40 mm to 45 mm, and
when the plurality of permanent magnets are viewed in plan from above or below, a ratio of a total surface area of the first magnet and the fourth magnet to a total surface area of the second magnet and the third magnet is 1:0.2 to 1:1.

2. The rotary electric machine according to claim 1, wherein, when a group including each one of the first magnet, the second magnet, the third magnet, and the fourth magnet is regarded as one set, a number of the groups is regarded as a number of sets, and two times the number of sets is regarded as a number of poles, the number of poles is 2 to 12, and
wherein a central angle α formed by a first radius and a second radius is represented by a following formula (1), the first radius drawn from a center of rotation of the rotor to one end in a circumferential direction of each of the first magnet and the fourth magnet, and the second radius drawn from the center of rotation to another end in the circumferential direction of each of the first magnet and the fourth magnet, and a central angle β formed by a third radius and a fourth radius is represented by a following formula (2), the third radius drawn from the center of rotation of the rotor to one end in a circumferential direction of each of the second magnet and the third magnet, and the fourth radius drawn from the center of rotation to another end in the circumferential direction of each of the second magnet and the third magnet:

$$(360/\text{number of poles})\times\tfrac{1}{2}\leq\alpha\leq(360/\text{number of poles})\times\tfrac{5}{6} \quad (1)$$

$$(360/\text{number of poles})\times\tfrac{1}{6}\leq\beta\leq(360/\text{number of poles})\times\tfrac{1}{2} \quad (2).$$

3. The rotary electric machine according to claim 1, wherein adjacent ones of the permanent magnets are placed in contact with each other.

4. The rotary electric machine according to claim 1, wherein an offset amount of the electromagnetic coil is a distance from an inner circumferential side end part of a flange portion to a distal end position on an inner circumferential side of the electromagnetic coil and is 5% to 11% of a total length of any of the teeth portions.

5. The rotary electric machine according to claim 1, wherein an angle of intersection between a base portion and an expanding portion is 108° to 130°.

6. The rotary electric machine according to claim 1, wherein a distance from an inner circumferential side end part to an outer circumferential side end part of a flange portion is 0.2 mm to 2.0 mm.

7. The rotary electric machine according to claim 1, wherein the teeth portions each include a base portion configured to protrude from an inner circumferential edge part of the yoke portion in the radially inward direction of the yoke portion, and a flange portion provided at a distal end of the base portion on an inner circumferential side, and configured to be wider than the base portion, and
wherein an average number of the base portions facing toward one of the first magnet or the fourth magnet is 1.5 to 20, and an average number of the base portions facing toward one of the second magnet or the third magnet is 0.5 to 12.

8. The rotary electric machine according to claim 7, wherein when the number of poles is 10 or 12, the average number of the base portions facing toward the one of the first magnet or the fourth magnet is 1.5 to 2.5, and the average number of the base portions facing toward the one of the second magnet or the third magnet is 0.5 to 1.5,
when the number of poles is 4, 6, or 8, the average number of the base portions facing toward the one of the first magnet or the fourth magnet is 1.5 to 5 and the average number of the base portions facing toward the one of the second magnet or the third magnet is 0.5 to 3, and
when the number of poles is 2, the average number of the base portions facing toward the one of the first magnet or the fourth magnet is 1.5 to 20 and the average number of the base portions facing toward the one of the second magnet or the third magnet is 0.5 to 12.

* * * * *